(12) United States Patent
Carroll

(10) Patent No.: US 6,721,646 B2
(45) Date of Patent: Apr. 13, 2004

(54) UNMANNED AIRCRAFT WITH AUTOMATIC FUEL-TO-AIR MIXTURE ADJUSTMENT

(76) Inventor: Ernest A. Carroll, 12913 Alton Square, No. 114, Herndon, VA (US) 20170

( * ) Notice: Subject to any disclaimer, the term of this patent is extended or adjusted under 35 U.S.C. 154(b) by 5 days.

(21) Appl. No.: 10/255,184

(22) Filed: Sep. 26, 2002

(65) Prior Publication Data

US 2003/0060962 A1 Mar. 27, 2003

Related U.S. Application Data

(60) Provisional application No. 60/324,931, filed on Sep. 27, 2001.

(51) Int. Cl.[7] ............................................. F02D 41/00
(52) U.S. Cl. ................. 701/103; 701/105; 123/DIG. 3; 123/676
(58) Field of Search ................................ 701/103, 105, 701/102, 115; 123/531, 676, 683, DIG. 3

(56) References Cited

U.S. PATENT DOCUMENTS

| | | | |
|---|---|---|---|
| 5,488,933 A | * | 2/1996 | Pham .................... 123/DIG. 3 |
| 5,537,909 A | | 7/1996 | Schneider et al. |
| 6,062,176 A | | 5/2000 | Berger |
| 6,343,596 B1 | * | 2/2002 | Hajji et al. .................. 123/676 |

* cited by examiner

*Primary Examiner*—Hieu T. Vo
(74) *Attorney, Agent, or Firm*—David L. Banner

(57) ABSTRACT

A miniature unmanned aircraft which uses remotely controlled model aircraft components and technology, and has on-board automatic "on-the-fly" fuel and air mixture adjustment enabling high altitude flight. The aircraft, which may have conventional fuselage, wing, reciprocating piston engine and radio frequency operated controls, also has sensors for sensing atmospheric pressure, atmospheric temperature, engine crankshaft rotational speed, engine temperature, and exhaust temperature. A microprocessor aboard the aircraft receives inputs from the sensors and controls at least one servo to adjust fuel and air mixture according to preprogrammed look-up tables and equations to operate the engine at appropriate fuel-to-air ratios for the altitude and other operating conditions.

11 Claims, 2 Drawing Sheets

UNMANNED AIRCRAFT WITH AUTOMATIC FUEL-TO-AIR MIXTURE ADJUSTMENT

REFERENCE TO RELATED APPLICATION

This application is related to copending applications respectively entitled MINIATURE, UNMANNED AIRCRAFT WITH ONBOARD STABILIZATION AND AUTOMATED GROUND CONTROL OF FLIGHT PATH, Ser. No. 10/255,183; MINIATURE, UNMANNED AIRCRAFT WITH AUTOMATICALLY DEPLOYED PARACHUTE, Ser. No. 10/255,185; MANUALLY DISASSEMBLED AND READILY SHIPPABLE MINIATURE, UNMANNED AIRCRAFT WITH DATA HANDLING CAPABILITY, Ser. No. 10/255,182; ENGINE DRIVEN SUPERCHARGER FOR AIRCRAFT, Ser. No. 10/255,189; CABLE CONNECTIONS BETWEEN AN UNMANNED AIRCRAFT AND A DETACHABLE DATA HANDLING MODULE, Ser. No. 10/255,187; ELECTRICAL POWER SUPPLY SYSTEM FOR UNMANNED AIRCRAFT, Ser. No. 10/255,188; and MINIATURE, UNMANNED AIRCRAFT WITH INTERCHANGEABLE DATA MODULE, Ser. No. 10/255,186, all filed of even date herewith and which are incorporated herein by reference, and claims priority to copending Serial No. 60/324,931, filed Sep. 27, 2001.

BACKGROUND OF THE INVENTION

1. Field of the Invention

The present invention relates to miniature, unmanned aircraft suitable for use in aerial data collection and transmission, and more particularly, to providing on-board ability to vary fuel-to-air ratios to compensate for varying altitude in such aircraft.

2. Description of the Prior Art

Aircraft can play a role in collection and transmission of data. In transmission of data, an aircraft can serve as a relaying station for remotely originating transmissions. In collection of data, aircraft can be used to carry sensors for reconnaissance and other purposes. Uses of aerial reconnaissance for collecting data, such as multispectral imagery for example, are increasing as industries and businesses come to utilize these technologies to enhance productivity of their operations. An exemplary use of aerial imagery is that of precision farming, although many other uses exist. As aerial imagery and other data collection technologies develop, it becomes desirable to decrease cost and increase practicality of airborne platforms used to acquire aerial imagery and other data.

Aerial imagery has traditionally been acquired through manned conventional aircraft and by satellite. Although both types of platforms are effective, both are quite expensive and limited in their abilities. Unmanned aircraft would be vastly more practical and lower in cost for most civilian data acquisition applications.

Model aircraft, remotely controlled by radio frequency signals, have long been utilized by hobbyists among others. This has led to remotely controlled model aircraft being suggested for use in aerial data collection. U.S. Pat. No. 6,062,176, issued to Lee Berger on May 16, 2000, and U.S. Pat. No. 5,537,909, issued to Arthur J. Schneider et al., both describe use of model or miniaturized aircraft in data imagery acquisition.

Conventional model or miniaturized aircraft typically utilize carbureted single cylinder, two or four stroke cycle reciprocating piston engines. Fuel-to-air ratios are established on the ground by adjusting screw type jets in the carburetor. Once set, such adjustments permit optimized conditions for flight within an altitude window on the order of two thousand feet or so. This satisfies the needs of hobbyists and many other applications for miniaturized aircraft. Most hobbyist use of model aircraft is limited to line of sight control and to the range of radio control devices presently in use, so that an altitude window of two thousand feet is not objectionable. However, there are applications for miniaturized aircraft which fly at much greater altitude from the launch or take off point than two thousand feet.

One specific example will be set forth. Government authorities investigating water resources may wish to obtain aerial imagery of large tracts of land to determine levels of ground water, as reflected by vigorousness of surface vegetation. It may be that comparing images with corresponding images taken at other times will yield the sought information. It would be possible for one image to cover a large land area, with little need for high resolution which would ordinarily be obtained by maintaining flight altitudes within two thousand feet above the ground. Rather, it may be desirable to conduct image acquisition at, for example, five thousand feet or ten thousand feet above the ground.

Operation at these altitudes causes problems when using conventional model aircraft as image acquisition platforms. Manual adjustment of fuel-to-air ratios limits aircraft operation to a predetermined altitude level, such as two thousand feet, which may fall well short of a desired flight altitude. Operating an aircraft above the predetermined limit will likely result in failure of engine operation. Even if the engine can operate, efficiency will be adversely affected, which will limit range of the aircraft.

If this limitation were overcome, the field of commercial unmanned aerial image acquisition would benefit greatly from being able to utilize engines and controls and other components which have been engineered and are readily available on the commercial market for data acquisition. This would greatly minimize costs of obtaining certain useful forms of aerial imagery. There exists a need to adapt existing model aircraft engines to extend the attainable altitude of the aircraft.

None of the above inventions and patents, taken either singly or in combination, is seen to describe the instant invention as claimed.

SUMMARY OF THE INVENTION

The present invention addresses the above described need by enabling automatic, "on-the-fly" adjustment of fuel-to-air ratios in miniature aircraft which utilize engines, servomechanisms, and other components commercially available to the hobbyist and other radio controlled or model aircraft market. Aircraft provided with this ability enable low cost miniature, unmanned aircraft to be used in obtaining imagery and other data and in transferring data. Transferred data can be that obtained by sensors aboard the miniature aircraft, or alternatively, the miniature aircraft may serve as a relay station having receiver and transmitter capability.

Regardless of the precise role and nature of the aircraft, it will be able to take off from the ground and fly to altitudes previously unattainable in model aircraft. Despite constraints of weight limits and provision of data obtaining and transferring apparatus, altitude ceilings up to twenty thousand feet above sea level have been realized with miniature aircraft using the present invention. Therefore, costs of conducting data acquisition and data transfer from aerial platforms flying at altitudes beyond the reach of model aircraft can be brought into line with costs associated with model aircraft. Also, the use of miniature, unmanned aircraft increases safety factors in that the mass of the aerial platform is enormously decreased over even small private aircraft having human pilots. Many private and governmental purposes can thus be served at costs and safety factors previously unrealized.

Accordingly, it is one principal object of the invention to provide miniature, unmanned aircraft with the ability to fly at altitudes considerably greater than those attainable by manually adjusted carburetion systems.

It is another object of the invention to enable aerial platforms having the general nature, costs, and complexity of model aircraft to gather and transfer data previously limited to remotely controlled model aircraft.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
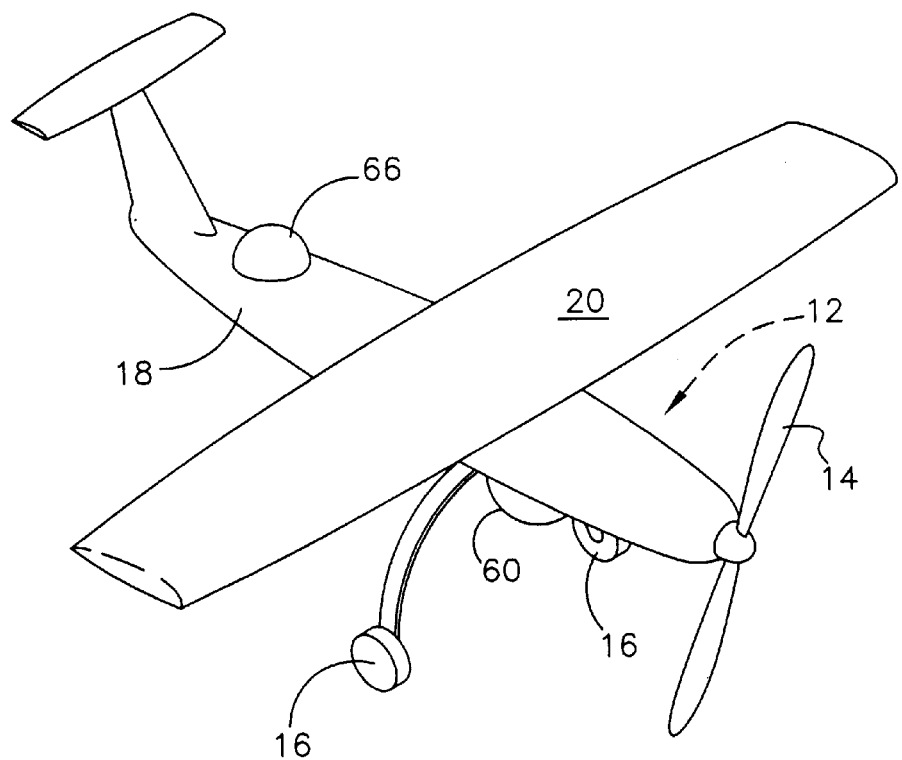
FIG. 1 is a perspective view of an embodiment of the invention.

FIG. 1 of the drawings shows an unmanned aircraft 10 which is remotely controlled. Flight capabilities are provided in part and to the greatest extent possible, by components utilized in conventional remote controlled or so-called "model" aircraft. Aircraft 10 has an airframe including an engine 12, a propeller 14, an associated fuel system (not shown), landing gear 16, and structural components such as a fuselage 18 having a wing 20 and flight components such as a rudder, an elevator, ailerons, and flaps. These components of fuselage 18 are conventional and will be understood to be included even though not all are separately shown. Similarly, aircraft 10 has a remotely controlled guidance system which will be further described hereinafter.

Conventional remotely controlled model aircraft are limited in altitude due to reliance upon manually set fuel and air mixture controls. The present invention provides on-board automatic "on-the-fly" fuel and air mixture adjustment which overcomes high altitude flight limitations of prior art unmanned aircraft.

Figure 2:
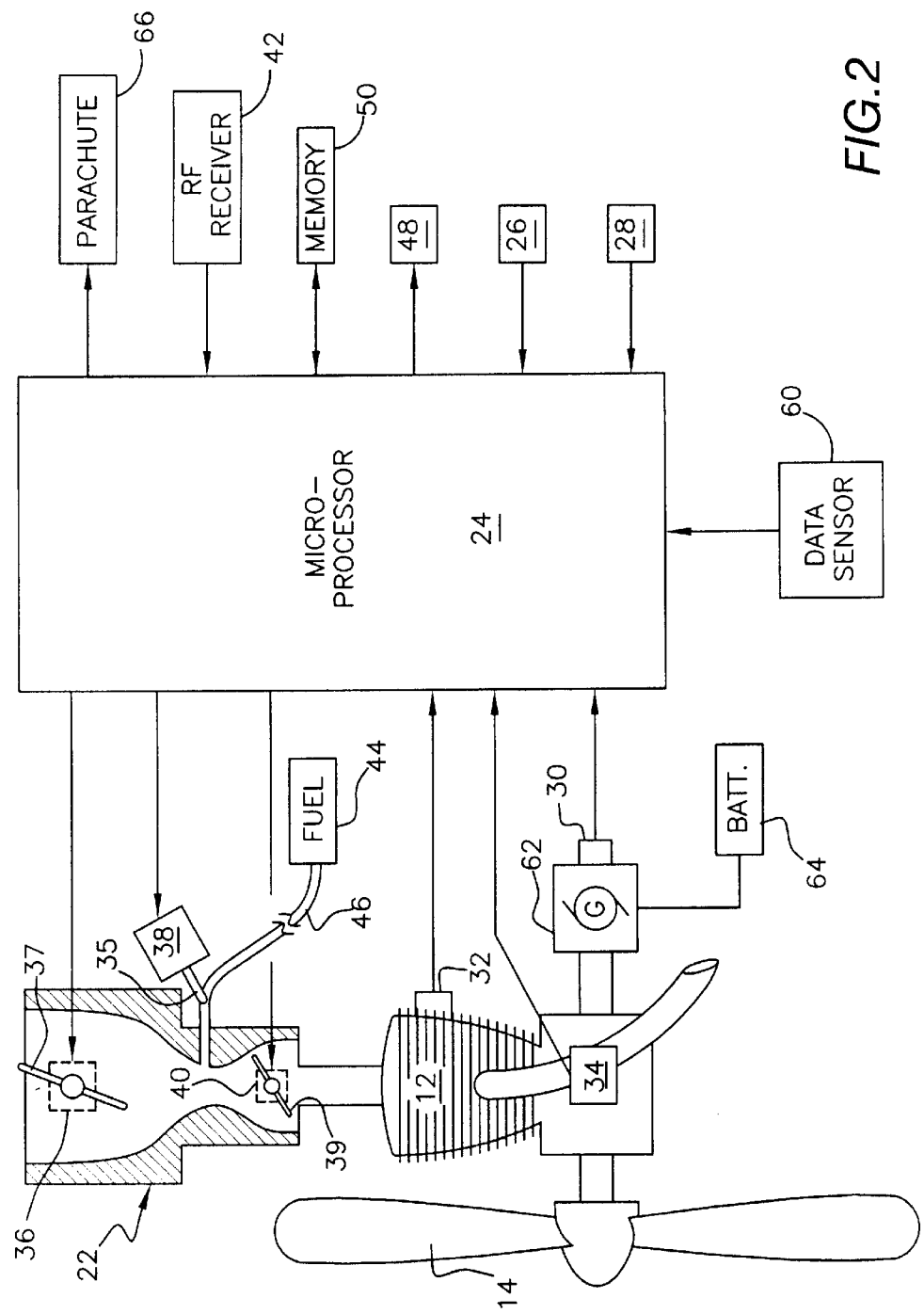
FIG. 2 is a diagrammatic view of engine and control components of the embodiment of FIG. 1.

Turning now to FIG. 2, engine 12 has a carburetor 22 disposed to supply a fuel and air mixture to engine 12. Fuel is stored in a conventional fuel tank (not separately shown). Engine 12 is a conventional reciprocating piston internal combustion engine of the two stroke or four stroke cycle type, preferably limited to two cylinders, but having at least one combustion chamber or combustion cylinder. Carburetor 22 operates under automatic control from a microprocessor 24 which receives inputs from sensors 26, 28, 30, 32, 34 disposed to monitor engine operation parameters. Microprocessor 24 is communicably connected to sensors 26, 28, 30, 32, 34 and is in turn operably connected to servomechanisms 36, 38, 40, 48. The fuel supply system will be understood to include a fuel tank 44, carburetor 22, a conduit 46 which conducts fuel from tank 44 to carburetor 22, an air inlet valve (not shown) for preventing vacuum from developing within tank 44, a fuel overflow dump conduit (not shown), and other conventional components necessary to supply a mixture of fuel and air to engine 12.

Sensor 26 monitors atmospheric pressure prevailing at aircraft 10. Sensor 28 monitors atmospheric temperature at aircraft 10. Sensor 30 monitors engine crankshaft rotational speed (conventionally referred to as RPM, revolutions per minute). Sensor 32 monitors engine temperature, preferably at the cylinder head (not separately shown). Sensor 34 monitors exhaust temperature near the exhaust port of engine 12. As clearly seen in FIG. 2, servomechanism 36 serves as a choke valve controller controlling a butterfly type choke valve 37. Servomechanism 38 serves as a fuel metering valve controller controlling a screw or needle type fuel metering valve 35, which varies flow of fuel into carburetor 22, and hence the ratio of fuel relative to airflow to engine 12. Servomechanism 40 serves as a throttle valve controller controlling a butterfly type throttle valve 39 for varying power output of engine 12. Servomechanism 38 periodically and automatically adjusts the mixture of fuel and air with regard to ratios of fuel to air. Presently, servomechanisms 36, 38, 40 are of well known type which can operate at a maximum rate of approximately forty operations per second. Operation is automatic in that servomechanisms 36, 38, 40 respond to command signals from microprocessor 24 without intervention or input from human operators.

Microprocessor 24 performs duties other than managing servomechanisms 36, 38, 40. Microprocessor 24 receives flight control commands from receiver 42 which commands are generated remotely. Other servomechanisms, shown collectively and representatively as 48, operate the rudder, elevator, flaps, and ailerons (not separately shown) to control direction of flight. These servomechanisms, together with microprocessor 24, comprise that portion of the remotely controlled guidance system carried aboard aircraft 10.

Microprocessor 24 includes memory 50 preloaded with look-up tables and equations that provide optimized fuel to air ratios and also loaded with programming for determining appropriate ratios of fuel to air upon applying values of atmospheric pressure and atmospheric temperature at aircraft 10, crankshaft rotational speed of engine 12, engine temperature, and exhaust temperature communicated by sensors 26, 28, 30, 32, and 34 to data processing procedures which invoke the tables and equations loaded into memory 50. Microprocessor 24 responsively generates command signals to operate servomechanisms 36, 38, 40 such that the fuel supply system supplies an appropriate mixture of fuel and air to engine 12 automatically, operating in the absence of control commands originating externally from aircraft 10.

Figure 3:
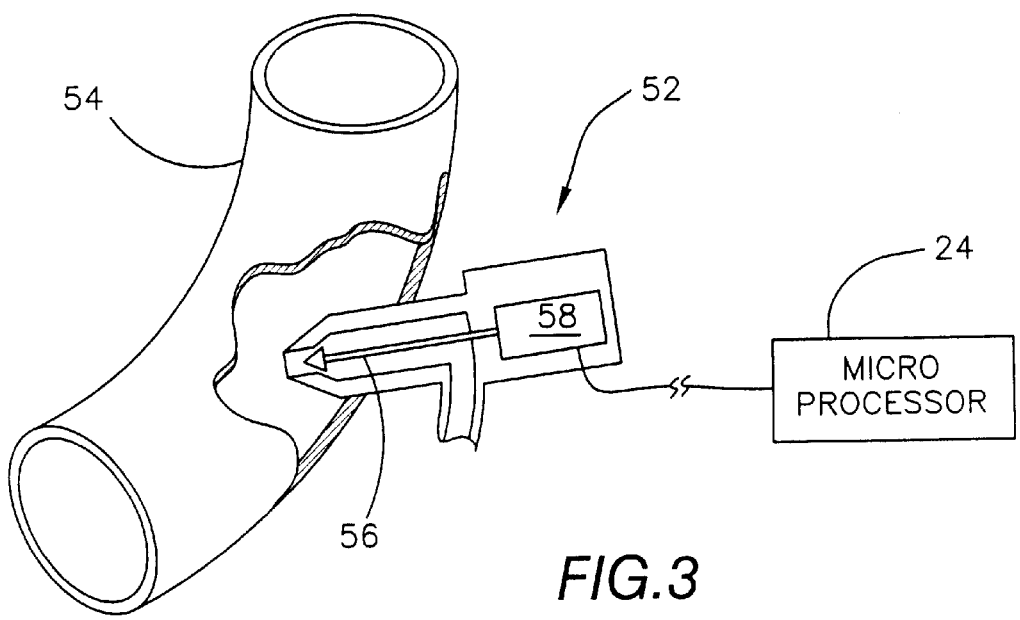
FIG. 3 is a diagrammatic view of an alternative form of fuel delivery to the engine.

It would be possible to replace carburetor 22 with a fuel injector 52 (see FIG. 3) arranged to inject fuel into an inlet runner 54. Fuel injector 52 is shown as having a pintle 56 operated by a solenoid 58 or other appropriate mechanism (not shown) under the control of microprocessor 24. Alternatively, the injector could inject fuel into a throttle body (not shown) corresponding to and provided in place of carburetor 22. In a further variation, the injector could inject the cylinder directly (this embodiment is not shown).

In the preferred embodiment, aircraft 10 provides functions beyond amusement. Namely, aircraft 10 serves as a mobile, aerial, unmanned data acquisition device or as a mobile, aerial, unmanned data relay station or as both. To accomplish these purposes, aircraft 10 has a data handling system having data storage capability or data transfer capability or both. The data handling system includes at least one sensor 60 for acquiring data relating to sensed characteristics or alternatively, a data receiver for receiving data transmitted from an external source. Where sensor 60 is omitted in favor of a data receiver, any suitable radio frequency transmitter (not separately shown) may be provided. Receiver 42 and the transmitter substituted for sensor 60 would enable aircraft 10 to function as an airborne relay station.

Sensor 60 may be any one of the following types. These types include an electro-optical device for obtaining digital images, similar to that employed in a U.S. Air Force unmanned aerial vehicle known by its acronym PREDATOR; a multispectral sensor similar in data output to SPOT and Landsat satellites; a hyperspectral sensor, similar in data output to a NASA sensor known by its acronym AVIRIS; a radar sensor similar in data output to J-stars (a U.S. Air Force theater battle management system); a thermal sensor similar to infrared based aircraft sensors; a wide field of view color sensor (e.g., a color camera); or an airborne repeater station in the event that aircraft 10 is to provide data transfer only rather than data acquisition. It will be recognized that other sensor types and data relay devices or both could also be used. In fact, aircraft 10 could be utilized for many other suitable purposes not explicitly mentioned herein.

Sensor 60 and demands imposed on microprocessor 24 require that an electrical power supply be provided. A suitable voltage regulating device, with or without other power control circuit elements (none shown) could also be added. Preferably, the power supply is provided by an engine driven generator 62 and a battery pack 64.

Particularly addressing civilian uses in the United States, it is highly desirable to have an unmanned aircraft which is light enough to avoid the fifty-five pound limit which is a threshold above which severe restrictions on use of an aircraft are imposed. This limitation can be met with appropriate construction of the airframe and selection of components.

The airframe is built from a composite structure including fiberglass, KEVLAR (RTM) fiber, and carbon, with aluminum, titanium, balsa wood and birch plywood structural subassemblies. The airframe can be built to house engine 12, propeller 14, the fuel supply system, microprocessor 24 and associated devices such as memory 50, radio frequency receiver 42, flight control sensors 26, 28, 30, 32, 34, servomechanisms 36, 38, 40, and data acquisition sensor 60, and to include a suitable fuel tank 44 (see FIG. 2), and be limited in weight to approximately twelve pounds.

A suitable engine, for example, producing six and one half horsepower at 10,000 RPM can be obtained as a commercial product on the remotely controlled aircraft market. Such an engine and its mounting (not shown) can be limited to seven and one half pounds.

The data acquisition, as described above, and supporting electronics may be limited to a single board computer based on Intel microprocessor architectures and can typically be limited to fifteen pounds.

The power supply system, including voltage regulators and rechargeable nickel metal hydride battery packs based upon 1.2 volt cells can be limited typically to five pounds.

A parachute subsystem 66 including a pyrotechnic deployment device similar to that utilized to deploy automotive airbags, capable of decelerating aircraft 10 to a landing speed not to exceed sixteen feet per second, can typically be limited to five pounds.

The above recited construction allows for seven and one half pounds of fuel, which in an airframe having a length of six to seven feet, wingspan of ten to twelve feet, and total weight under fifty-five pounds, can sustain operation at an average speed of fifty-five miles per hour for three hours. The above specifications allow a three pound margin of error to allow for variation in specific component selection and fabrication techniques.

The same aircraft can be built for military applications which are exempt from weight limits and other considerations. In such cases, dimensions and weights may be increased. Additional fuel may be carried to increase speed, range, acceleration and additional internal power consumption such as multiple data acquisition sensors imposing more electrical burden on the generator than is the case when a single data acquisition sensor is employed.

It would also be possible to forego a data acquisition sensor and data relaying apparatus, and operate aircraft 10 for amusement, taking advantage of altitude capabilities beyond those of conventional remotely controlled aircraft.

It is to be understood that the present invention is not limited to the embodiments described above, but encompasses any and all embodiments within the scope of the following claims.

I claim:

1. An unmanned aircraft having a remotely controlled guidance system, a reciprocating piston internal combustion engine, a fuel supply system disposed to supply a mixture of fuel and air to said engine, at least one sensor disposed to monitor engine operation parameters, at least one control disposed to substantially automatically adjust said mixture of fuel and air with regard to ratios of fuel to air, and a microprocessor communicably connected to at least one of said sensors and operably connected to said at least one control, wherein said microprocessor has programming disposed to calculate appropriate ratios of fuel to air and to operate said at least one control such that said fuel supply system supplies an appropriate mixture of fuel and air to said engine in the absence of control commands originating externally from said aircraft.

2. The unmanned aircraft according to claim 1, wherein a maximum gross weight of said unmanned aircraft is limited to fifty-five pounds.

3. The unmanned aircraft according to claim 1, wherein said microprocessor is disposed to operate said at least one control such that said fuel supply system continuously adjusts the mixture of fuel and air.

4. The unmanned aircraft according to claim 1, wherein said microprocessor is disposed to operate said at least one control such that said fuel supply system periodically adjusts the mixture of fuel and air.

5. The unmanned aircraft according to claim 1, wherein said fuel supply system includes a carburetor having a choke valve and a choke valve controller under control of said microprocessor.

6. The unmanned aircraft according to claim 1, wherein said fuel supply system includes a carburetor having a throttle valve and a throttle valve controller under control of said microprocessor.

7. The unmanned aircraft according to claim 1, wherein said fuel supply system includes a carburetor having a fuel valve and a fuel valve controller under control of said microprocessor.

8. The unmanned aircraft according to claim 1, wherein said fuel supply system includes a fuel injector and a fuel injector controller under control of said microprocessor.

9. The unmanned aircraft according to claim 1, wherein said at least one sensor disposed to monitor engine operation parameters monitors and communicates to said microprocessor at least one of the parameters of atmospheric pressure at said aircraft, atmospheric temperature at said aircraft, crankshaft rotational speed of said engine, engine temperature, and exhaust temperature, and said microprocessor applies at least one of values of atmospheric pressure at said aircraft, atmospheric temperature at said aircraft, crankshaft rotational speed of said engine, engine temperature, and exhaust temperature communicated by said at least one sensor to data processing which determines appropriate ratios of fuel to air.

10. The unmanned aircraft according to claim 9, wherein said microprocessor has stored in memory look-up tables relating to ratios of fuel to air for diverse operating conditions, and utilizes said look-up tables when operating said at least one control to adjust ratios of fuel to air.

11. The unmanned aircraft according to claim 1, wherein said reciprocating piston internal combustion engine is limited to a maximum of two cylinders.

* * * * *